United States Patent
Kobayashi et al.

(10) Patent No.: US 10,704,807 B2
(45) Date of Patent: Jul. 7, 2020

(54) BINARY REFRIGERATION APPARATUS

(71) Applicant: PHC HOLDINGS CORPORATION, Tokyo (JP)

(72) Inventors: Susumu Kobayashi, Gunma (JP); Hiroyuki Satou, Saitama (JP)

(73) Assignee: PHC HOLDINGS CORPORATION, Tokyo (JP)

(*) Notice: Subject to any disclaimer, the term of this patent is extended or adjusted under 35 U.S.C. 154(b) by 1124 days.

(21) Appl. No.: 14/668,974

(22) Filed: Mar. 25, 2015

(65) Prior Publication Data

US 2015/0198357 A1 Jul. 16, 2015

Related U.S. Application Data

(63) Continuation of application No. PCT/JP2013/005706, filed on Sep. 26, 2013.

(30) Foreign Application Priority Data

Sep. 28, 2012 (JP) .................. 2012-218272
Sep. 28, 2012 (JP) .................. 2012-218277

(51) Int. Cl.
*F25B 7/00* (2006.01)
*C09K 5/04* (2006.01)
(Continued)

(52) U.S. Cl.
CPC .............. *F25B 7/00* (2013.01); *C09K 5/042* (2013.01); *F25B 9/002* (2013.01); *F25B 31/004* (2013.01); *F25B 40/00* (2013.01); *F25B 43/02* (2013.01)

(58) Field of Classification Search
CPC .. F25B 7/00; F25B 40/00; F25B 43/02; F25B 9/002; F25B 31/004; C09K 5/042
(Continued)

(56) References Cited

U.S. PATENT DOCUMENTS 5,351,499 A * 10/1994 Takemasa .............. C09K 5/045
252/67
6,951,115 B2 * 10/2005 Yuzawa .................. C09K 5/045
252/67
(Continued)

FOREIGN PATENT DOCUMENTS

JP    03-200895 A    9/1991
JP    03-217495 A    9/1991
(Continued)

OTHER PUBLICATIONS

International Search Report issued in International Application No. PCT/JP2013/005706 dated Dec. 10, 2013, with English Translation.

*Primary Examiner* — Steve S Tanenbaum
(74) *Attorney, Agent, or Firm* — McDermott Will & Emery LLP

(57) ABSTRACT

An ultralow binary refrigeration apparatus, which cools an enclosed space to an ultralow temperature of −80° C. or lower to be used for storing cells or microorganisms, for example, without posing worries in regard of Ozone Depletion Potential (ODP) and Global Warming Potential (GWP), and which is excellent in refrigerant stability, can dispense with an oil separator, and enables a reduction in the amount of refrigerant, or a reduction in the power output of the compressor. The object is achieved by a binary refrigeration apparatus configured by connecting a high temperature refrigeration cycle and a low temperature refrigeration cycle via a cascade condenser, in which the high temperature refrigeration cycle is filled with propane as a refrigerant and a refrigerator oil, while the low temperature refrigeration cycle is filled with a hydrocarbon having a boiling point of −80° C. or lower as a refrigerant, a refrigerator oil, and an oil return agent.

7 Claims, 3 Drawing Sheets

(51) Int. Cl.
     *F25B 40/00*     (2006.01)
     *F25B 31/00*     (2006.01)
     *F25B 43/02*     (2006.01)
     *F25B 9/00*     (2006.01)

(58) Field of Classification Search
     USPC .......................................................... 62/335
     See application file for complete search history.

(56)     References Cited

U.S. PATENT DOCUMENTS

| | | |
|---|---|---|
| 7,234,310 B2 | 6/2007 | Flynn et al. |
| 2004/0118145 A1* | 6/2004 | Takasugi ................... F25B 7/00 |
| | | 62/335 |
| 2005/0044885 A1* | 3/2005 | Pearson ................... F25B 1/02 |
| | | 62/512 |
| 2007/0000261 A1 | 1/2007 | Flynn et al. |
| 2008/0184735 A1* | 8/2008 | van Wijngaarden ... B63B 25/16 |
| | | 62/613 |

FOREIGN PATENT DOCUMENTS

| | | |
|---|---|---|
| JP | 03-260557 A | 11/1991 |
| JP | 2000-105047 A | 4/2000 |
| JP | 2004-125199 A | 4/2004 |
| JP | 2005-539194 A | 12/2005 |
| JP | 2008-239784 A | 10/2008 |
| JP | 2012-172890 A | 9/2012 |

\* cited by examiner

BINARY REFRIGERATION APPARATUS

RELATED APPLICATIONS

This application is a Continuation of International Application No. PCT/JP2013/005706, filed on Sep. 26, 2013, which in turn claims the benefit of Japanese Application No. 2012-218272, filed on Sep. 28, 2012 and Japanese Application No. 2012-218277, filed on Sep. 28, 2012, the disclosures of which Applications are incorporated by reference herein.

TECHNICAL FIELD

The present invention relates to a binary refrigeration apparatus, and more particularly to an ultralow temperature binary refrigeration apparatus that cools an enclosed space to an ultralow temperature of −80° C. or lower, to be used in the biotechnological field, for example, for storing cells or microorganisms.

BACKGROUND ART

Binary refrigeration apparatuses of this type have hitherto been used, with a refrigerant circuit shown in the diagram of FIG. 2, for example (see Patent Literatures 1 and 2).

In the figure, S1 denotes a high temperature refrigeration cycle, and S2 denotes a low temperature refrigeration cycle. The discharge-side pipe 2 of a compressor 1 that constitutes the high temperature refrigeration cycle S1 is connected to an auxiliary condenser 3, which is connected to a cascade condenser 11, successively via an oil cooler 4 of the compressor 1, an auxiliary condenser 5, an oil cooler 7 of a compressor 6 that constitutes the low temperature refrigeration cycle S2, a condenser 8, a dryer 9, and a capillary tube 10 in a heat exchanger 30; and further, via a fluid collector 12 and the heat exchanger 30 eventually to the intake-side pipe 13 of the compressor 1. A cooling fan 14 is provided for cooling the respective condensers 3, 5, and 8.

The discharge-side pipe 15 of the compressor 6 in the low temperature refrigeration cycle S2 is connected to an oil separator 16, where a compressor oil is separated to be returned to the compressor 6 via a return pipe 17. The cycle is configured such that the refrigerant flows into the pipe 18 to exchange heat with an intake-side heat exchanger 19, after which the refrigerant passes through the pipe 20 in the cascade condenser 11 to condense, flows through a dryer 21, a capillary tube 22, and into an evaporator 24 from an inlet pipe 23, and then exits from an outlet pipe 25 to return to the compressor 6 through the intake-side heat exchanger 19 and through the intake-side pipe 26 of the compressor 6.

An expansion tank 27 is connected to the intake-side pipe 26 via a capillary tube 28.

CFC (chlorofluorocarbon) and HCFC (hydrochloro fluorocarbon) that were conventionally used as refrigerants in refrigeration apparatuses have been regulated in view of the problem of ozone layer depletion in recent years, and now HFC (hydrofluorocarbon) is being used as a refrigerant instead of these.

With CFC or HCFC used as a refrigerant, hydrocarbon oils such as mineral oil and alkylbenzene have been used preferably as a refrigerator oil. With a different refrigerant, however, the refrigerator oil used therewith may exhibit unpredictable behaviors in terms of compatibility with the refrigerant, lubricity, viscosity of solution in the refrigerant, thermal and chemical stability, and so on, and therefore a new type of refrigerator oil needs to be developed for each refrigerant. For example, ester-based refrigerator oils (see Patent Literature 3) and carbonic acid ester-based refrigerator oils (see Patent Literature 4) to be used with HFC refrigerants have been developed. Among these refrigerator oils, esters are widely used in applications such as refrigerators and air-conditioners.

Thus, a binary refrigeration apparatus configured by connecting a high temperature refrigeration cycle S1 and a low temperature refrigeration cycle S2 via a cascade condenser 11 has been used, wherein the high temperature refrigeration cycle S1 is filled with HFC refrigerants (R-407D, R404A) and an alkylbenzene oil or an ester oil as a refrigerator oil, while the low temperature refrigeration cycle S2 is filled with HFC refrigerants (R-508A, B) and an alkylbenzene oil or an ester oil as a refrigerator oil.

Table 1 shows the refrigerant temperatures at points A to D in the high temperature refrigeration cycle S1 and the refrigerant temperatures at points a to d in the low temperature refrigeration cycle S2 in environments with room temperatures of 30° C. and 5° C., respectively.

TABLE 1

| REFRIGERANT | HIGH TEMPERATURE CYCLE: R404A LOW TEMPERATURE CYCLE: R508B | |
|---|---|---|
| | TEMPERATURES OF VARIOUS PARTS | |
| | HIGH ROOM TEMPERATURE ENVIRONMENT OF 30° C. | LOW ROOM TEMPERATURE ENVIRONMENT OF 6° C. |
| A | 71° C. | 38° C. |
| B | 34° C. | 7° C. |
| C | −38° C. | −49° C. |
| D | 15° C. | −1° C. |
| a | 67° C. | 40° C. |
| b | −90° C. | −96° C. |
| c | −89° C. | −98° C. |
| d | 18° C. | 4° C. |

These HFC refrigerants, however, are also beginning to be regulated because of their high Global Warming Potential (GWP), although their Ozone Depletion Potential (ODP) is zero. Thus, development of a refrigerant that can substitute these HFCs is an urgent issue.

Since a refrigerator oil for lubricating refrigerant compressors usually circulates with the refrigerant in a refrigerant circulation cycle of a refrigeration apparatus, such a refrigerator oil is required to have compatibility with the refrigerant. However, with the use of hydrocarbon oils such as a mineral oil or an alkylbenzene or an ester oil, which are conventionally used for HFC refrigerants, problems would occur in particular with alkylbenzene, for example, which does not provide sufficient compatibility between the refrigerant and the refrigerator oil, such as lubrication failure due to a reduction in the amount of refrigerator oil inside the refrigerant compressor, and blockage of an expansion mechanism such as capillaries, as a result of stagnation of the refrigerator oil in the cycle after discharged from the refrigerant compressor. With an ester oil, while good compatibility with HFC refrigerants is achieved, there was a problem of performance deterioration due to hydrolysis during use.

Another problem was that, one day after the operation of the binary refrigeration apparatus was stopped, for example, when the compressor 1 of the high temperature refrigeration cycle S1 is started up to operate the apparatus, and, upon the refrigerant temperature at the exit of the cascade condenser 11 reaching a predetermined temperature (of, for example, −34° C.), when an attempt is made to start the compressor 6 of the low temperature refrigeration cycle S2, the compressor 6 could not be started up, because the pressure is high in the low temperature refrigeration cycle that was stopped, or even if the compressor 6 could be started, the pressure of the compressor 6 would soon exceed a level determined by safety standards so that a safety device was activated and the compressor was stopped.

Therefore, it was common practice to introduce part of the refrigerant from the intake-side pipe 26 through the capillary tube 28 to the expansion tank 27 to lower the pressure inside the low temperature refrigeration cycle S2, before starting up the compressor 6. The refrigerant introduced to the expansion tank 27 is returned little by little back to the low temperature refrigeration cycle S2 to be used, through the capillary tube 28 after the start of operation of the compressor 6.

CITATION LIST

Patent Literature

Patent Literature 1: Japanese Patent Application Laid-Open No. Hei. 3-260557
Patent Literature 2: Japanese Patent Application Laid-Open No. 2000-105047
Patent Literature 3: Japanese Patent Application Laid-Open No. Hei. 03-200895
Patent Literature 4: Japanese Patent Application Laid-Open No. Hei. 03-217495

SUMMARY OF INVENTION

Technical Problem

An object of the present invention is to provide an ultralow temperature binary refrigeration apparatus, which cools an enclosed space to an ultralow temperature of −80° C. or lower to be used in the biotechnological field for storing cells or microorganisms, for example, without posing worries in regard of Ozone Depletion Potential (ODP) and Global Warming Potential (GWP), and which is excellent in refrigerant stability, can dispense with an oil separator due to very good compatibility between the refrigerant and the refrigerator oil, and enables a reduction in the amount of refrigerant or a reduction in the power output of the compressor, due to high COPs as compared with HFC-operated cycles.

Solution to Problem

To solve the problems described above, one aspect of the present application resides in a binary refrigeration apparatus configured by connecting a high temperature refrigeration cycle and a low temperature refrigeration cycle via a cascade condenser, which is characterized in that the high temperature refrigeration cycle is filled with propane and a refrigerator oil, while the low temperature refrigeration cycle is filled with a refrigerant including a hydrocarbon having a boiling point of −80° C. or lower, a refrigerator oil, and an oil return agent. The low temperature refrigeration cycle includes an evaporator, and an ultralow temperature of −80° C. or lower is produced by evaporating the hydrocarbon in the evaporator. The oil return agent is contained in an amount of from 0.1 to 14 mass % with respect to the refrigerant in the low temperature refrigeration cycle. Furthermore, the low temperature refrigeration cycle does not include an oil separator.

In the foregoing binary refrigeration apparatus, the hydrocarbon having a boiling point of −80° C. or lower is ethane only, and the refrigerator oil is an alkylbenzene oil.

In any of the foregoing binary refrigeration apparatus, the oil return agent is n-pentane.

Advantageous Effect of Invention

In one aspect of the present application, a binary refrigeration apparatus is configured by connecting a high temperature refrigeration cycle and a low temperature refrigeration cycle via a cascade condenser and is characterized in that the high temperature refrigeration cycle is filled with propane as a refrigerant and a refrigerator oil, while the low temperature refrigeration cycle is filled with a hydrocarbon having a boiling point of −80° C. or lower as a refrigerant, a refrigerator oil, and an oil return agent. With the use of propane and a hydrocarbon having a boiling point of −80° C. or lower as the refrigerants, low temperatures of about −40° C. are produced in the cascade condenser 11 of the high temperature refrigeration cycle S1, while ultralow temperatures of −80° C. or lower are produced in the evaporator 24 of the low temperature refrigeration cycle S2 without worries regarding the Ozone Depletion Potential (COP) and Global Warming Potential (GWP). With the use of a hydrocarbon having a boiling point of −80° C. or lower as the refrigerant, an refrigerator oil, and an oil return agent that fill the low temperature refrigeration cycle, the compatibility between the refrigerant and the refrigerator oil is significantly improved, so that problems such as stagnation of the refrigerator oil discharged from the refrigerant compressor in the cycle, lubrication failure due to a decrease in the amount of refrigerator oil in the refrigerant compressor, and blockage in an expansion mechanism such as capillaries will not occur. As a result, remarkable effects are achieved, such as that the oil separator is no longer necessary, the refrigerant is excellent in stability as the oil does not undergo hydrolysis as an ester oil does during use, and the apparatus yields higher COPs as compared with HFC-operated cycles so that the amount of refrigerant can be reduced, or the power output of the compressor can be reduced. In addition, the oil return agent is contained in an amount of from 0.1 to 14 mass % with respect to the refrigerant in the low temperature refrigeration cycle, which provides a further remarkable effect of making sure that the effect of n-pentane as the oil return agent is achieved. Furthermore, the low temperature refrigeration cycle does not include an oil separator, which provides further remarkable effects of size reduction of the apparatus, energy saving, and omission of operation for separating oil.

In another aspect of the present application, the hydrocarbon having a boiling point of −80° C. or lower used as the refrigerant is ethane only, and the refrigerator oil is an alkylbenzene oil. Since the hydrocarbon is ethane alone that has a boiling point of −89° C., ultralow temperatures of −80° C. or lower are produced reliably in the evaporator 24 of the low temperature refrigeration cycle S2. The combination of ethane and an alkylbenzene oil filled therein provides further remarkable effects of high stability, as the oil does not undergo hydrolysis as an ester oil does during use, as well as much improved compatibility between the refrigerant and the refrigerator oil.

In another aspect of the present application, the oil return agent is n-pentane. N-pentane used as the oil return agent remains in the liquid state in the low temperature refrigeration cycle and has a very good compatibility with the refrigerant, so that it ensures stable solution of the refrigerant oil to be circulated in the low temperature refrigeration cycle and thereby provides a further remarkable effect of making sure that the above-mentioned effects are achieved.

DESCRIPTION OF EMBODIMENTS

Embodiments of the present invention will be hereinafter described in detail with reference to the drawings.

Figure 1:
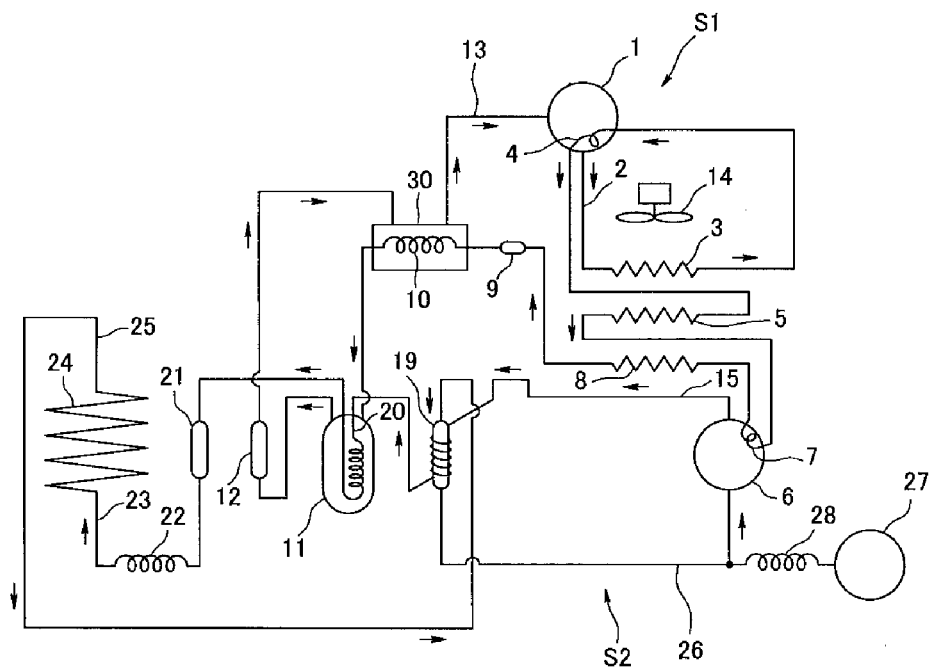
FIG. 1 is a diagram for explaining one example of a refrigerant circuit of a binary refrigeration apparatus according to the present invention.

FIG. 1 is a diagram for explaining one example of a refrigerant circuit of the binary refrigeration apparatus according to the present invention.

Figure 2:
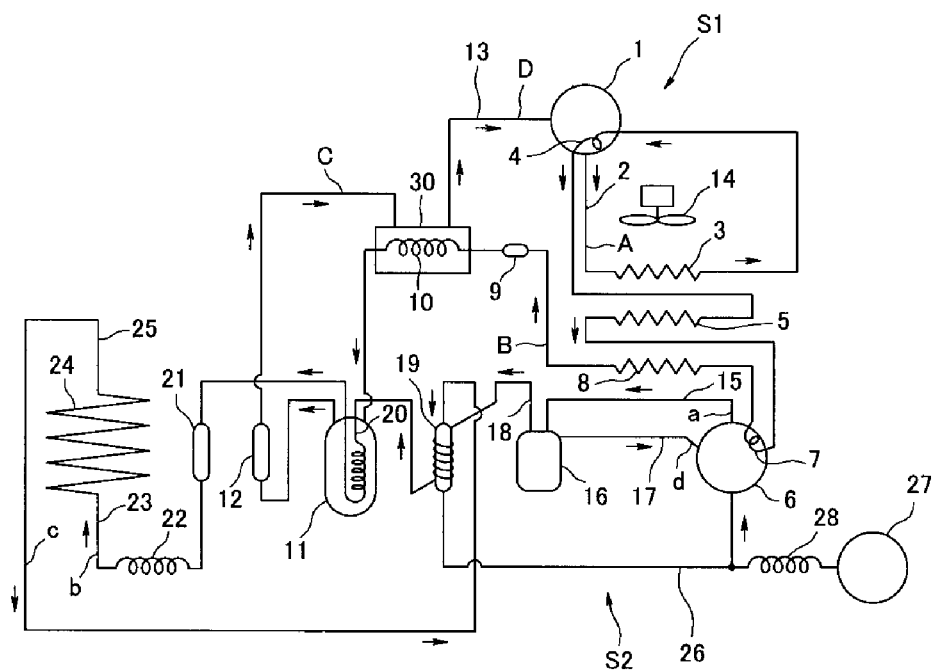
FIG. 2 is a diagram for explaining one example of a refrigerant circuit of a conventional binary refrigeration apparatus.

In FIG. 1, same components as those shown in FIG. 2 are given the same reference numerals.

The high temperature refrigeration cycle S1 is filled with propane (refrigerant) containing a refrigerator oil composed of an alkylbenzene oil, while the low temperature refrigeration cycle S2 is filled with ethane (refrigerant) containing a refrigerator oil composed of an alkylbenzene oil and an oil return agent composed of n-pentane.

The discharge-side pipe 2 of a compressor 1 that constitutes the high temperature refrigeration cycle S1 is connected to an auxiliary condenser 3, which is connected to a cascade condenser 11, successively via an oil cooler 4 of the compressor 1, an auxiliary condenser 5, an oil cooler 7 of a compressor 6 that constitutes the low temperature refrigeration cycle S2, a condenser 8, a dryer 9, and a capillary tube 10 in a heat exchanger 30; and further, via a fluid collector 12 and the heat exchanger 30 eventually to the intake-side pipe 13 of the compressor 1. The cascade condenser 11 of the high temperature refrigeration cycle S1 produces low temperatures of about −40° C.

The discharge-side pipe 15 of the compressor 6 of the low temperature refrigeration cycle S2, on the other hand, is connected to an intake-side heat exchanger 19, where heat exchange takes place, after which the refrigerant passes through the pipe 20 in the cascade condenser 11 to condense, flows through a dryer 21, a capillary tube 22 and into an evaporator 24 from an inlet pipe 23. Ethane is mostly vaporized in the evaporator 24, thereby producing cold energy and ultralow temperatures of −80° C. or lower. Ethane vapor exits from an outlet pipe 25, travels through the intake-side heat exchanger 19, and returns to the compressor 6 from the intake-side pipe 26 of the compressor 6.

It is generally known that, for prolonged storage without chemical or physical change, biological samples such as cell lines, DNAs, blood, and bone-marrow cells need to be kept at temperatures of about −80° C. or lower, at which the growth rate of ice crystal drops significantly and enzyme activities stop completely. It is said that cells need to be placed at temperatures of about −135° C. or lower for prolonged storage in an amorphous glassy state without ice crystal formation and recrystallization.

Even if all the ethane is vaporized in the evaporator 24, n-pentane used as the oil return agent will remain in the liquid state in the low temperature refrigeration cycle S2, so that the refrigerator oil composed of an alkylbenzene oil dissolved therein can stably be circulated in the low temperature refrigeration cycle S2. Therefore, problems such as stagnation of the refrigerator oil in the cycle S2, lubrication failure due to a decrease in the amount of refrigerator oil in the refrigerant compressor 6, and blockage in an expansion mechanism such as capillaries will not occur.

This enabled optional omission of the oil separator 16, which was essential in the conventional binary refrigeration apparatus as shown in FIG. 2.

Examples of hydrocarbons having a boiling point of −80° C. or lower that can be used as the refrigerant in the present invention may include not only saturated hydrocarbons such as ethane (boiling point: −89° C.) and methane (boiling point: −162° C.), but also ethylene-based hydrocarbons, and mixtures of these.

Specific examples of the oil return agent in the refrigerator oil used in the present invention may include n-butane (boiling point: −5.6° C.), isobutane (boiling point: −11.7° C.), n-pentane (boiling point: 36.1° C.), n-hexane (boiling point: 68.7° C.), isohexane (boiling point: 60.3° C.), 3-methylpentane (boiling point: 63.3° C.), neohexane (boiling point: 49.7° C.), 2,3-dimethylbutane (boiling point: 57.9° C.), and mixtures of two or more of these.

The content of the oil return agent is preferably, but not limited to, 0.1 to 14 mass % with respect to the refrigerant. If the content of the oil return agent is less than 0.1 mass %, the oil return effect may not be achieved, whereas, if it exceeds 14 mass %, the refrigerant will have an unfavorably high flammability.

Mixing a hydrocarbon such as n-pentane in the refrigerant as an oil return agent improves compatibility with the refrigerator oil, so that the oil discharged from the compressor can better be returned to the compressor, which in turn enables use of mineral oils and alkylbenzene oils such as HAB (hard alkylbenzene) oils having poor compatibility with the refrigerant without the problem of possible lubrication failure in the compressor due to a reduction in the amount of oil returning to the compressor.

Specific examples of mineral oils that can be used may include paraffin oil, naphthenic oil, and n-paraffin, which are produced by refining a lubricating oil fraction of crude oil that is obtained by atmospheric distillation or reduced-pressure distillation. Any of the refinement processes such as solvent deasphalting, solvent extraction, hydrogenolysis, solvent dewaxing, catalytic dewaxing, hydrorefining, sulfuric acid treatment, white clay treatment and the like may be used in a suitable combination.

Mineral oils and alkylbenzene oils are chemically and physically stable and provide excellent lubrication properties, because of which they have conventionally been used as the refrigerator oil in refrigerant circuits. They are easy to handle and inexpensive.

These refrigerator oils can also be used with known additives such as an antioxidant, an antirust agent, an anticorrosion agent, a pour-point depressant, a defoaming agent and the like, either alone or in combination of several types for the purpose of enhancing respective properties.

In the present invention, cooling temperatures of −80° C. or lower can be produced by full mode operation of the high temperature refrigeration cycle S1 and low temperature refrigeration cycle S2. Optionally, though, a cooling temperature of, for example, −18° C. can be produced by ON/OFF operation with reduced ON time.

In the present invention, the apparatus may also be operated under supercritical pressure and temperature of the refrigerant to produce cold energy by adiabatic expansion of refrigerant in a supercritical state without condensing and liquefying the refrigerant.

IEC Standards and Compliance

The IEC (International Electrotechnical Commission) has set a regulation that one refrigerant cycle that uses hydrocarbon must not contain more than 150 g refrigerant, in consideration of the hazardous effects of, for example, possible leakage of hydrocarbon refrigerant to the outside.

With the refrigerant contained in an amount of 150 g or less per one refrigerant circuit in compliance with the IEC regulation noted above, the binary refrigeration apparatus that uses a hydrocarbon as the refrigerant and is configured as described above could still be started up, but one problem remained, which was that the pressure in the compressor of the low temperature refrigeration cycle would exceed the level determined by safety standards soon after the start-up.

Accordingly, a binary refrigeration apparatus that does not require an expansion tank as well as can be started up in a manner that complies with the IEC regulation noted above is desirable.

Next, how the binary refrigeration apparatus according to the present invention that does not require an expansion tank is started up will be described with reference to FIG. 3 and FIG. 4.

Figure 3:
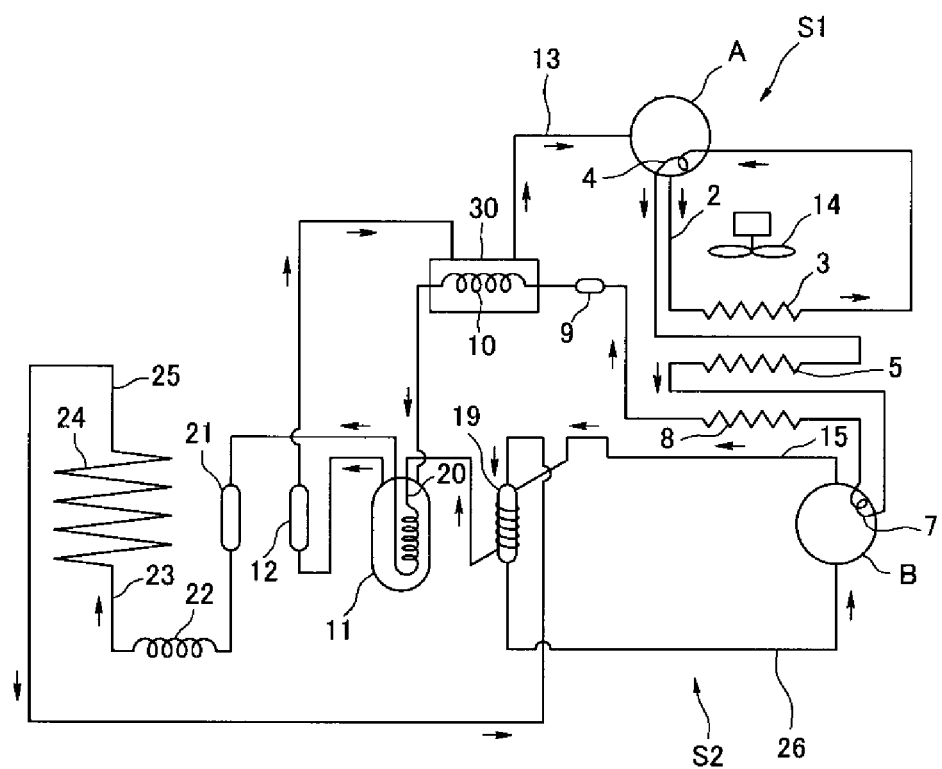
FIG. 3 is a diagram for explaining a refrigerant circuit of the binary refrigeration apparatus according to the present invention that does not require an expansion tank.

The binary refrigeration apparatus according to the present invention shown in FIG. 3 is configured the same as the binary refrigeration apparatus according to the present invention shown in FIG. 1 except that the capillary tube 28 and the expansion tank 27 are not provided, and therefore will not be described again.

Figure 4:
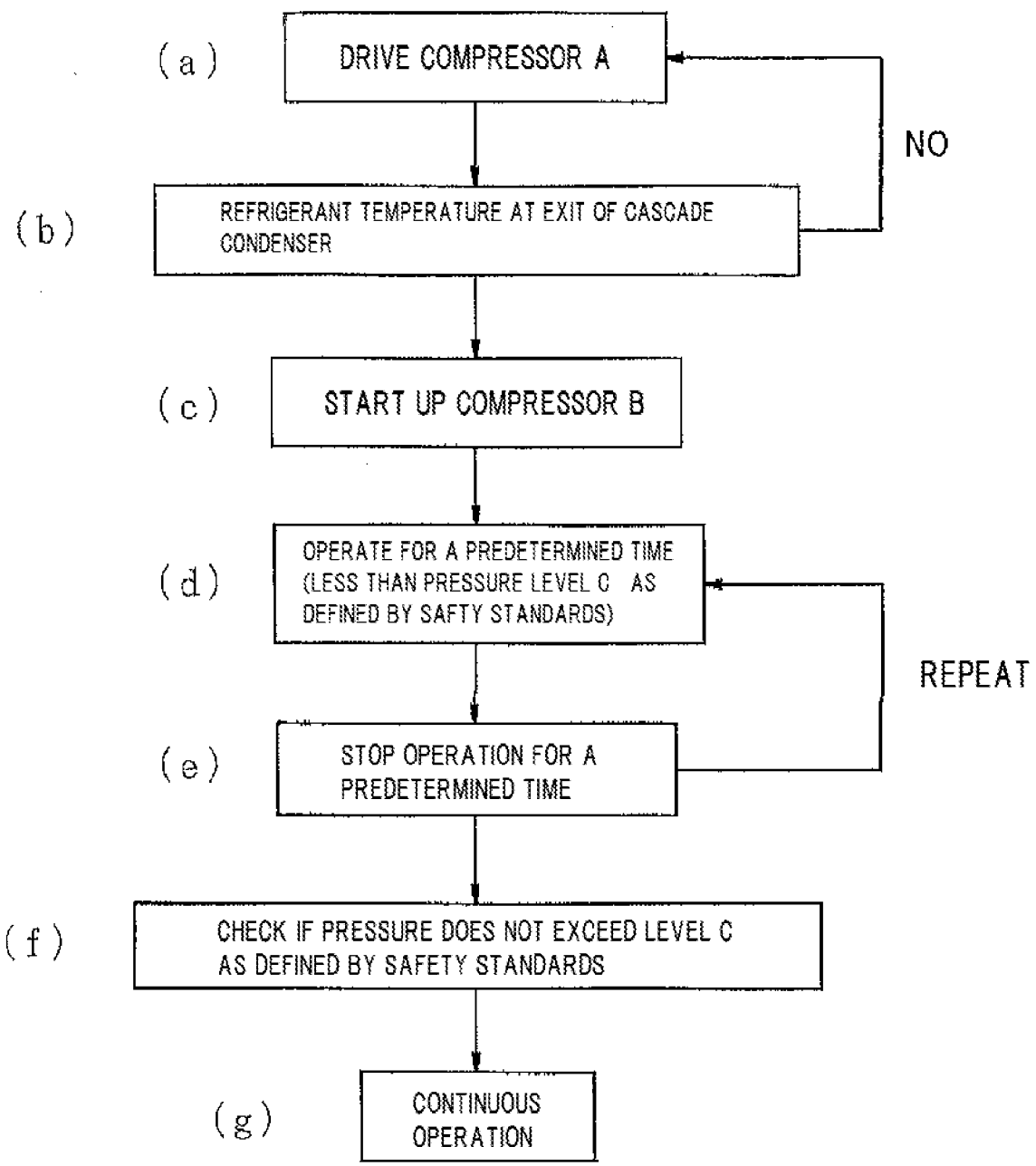
FIG. 4 is a schematic flowchart for explaining how the binary refrigeration apparatus according to the present invention shown in FIG. 3 that does not require an expansion tank is started up.

FIG. 4 is a schematic flowchart for explaining how the binary refrigeration apparatus according to the present invention shown in FIG. 3 that does not require an expansion tank is started up.

(a) First, the compressor A in the high temperature refrigeration cycle S1 of the binary refrigeration apparatus that was stopped is started up.

(b) The compressor B of the low temperature refrigeration cycle S2 is not started until a predetermined refrigerant temperature (of, for example, −34° C.) is achieved at the exit of the cascade condenser 11.

(c) The compressor B of the low temperature refrigeration cycle S2 is started when the predetermined refrigerant temperature is achieved at the exit of the cascade condenser 11.

(d) After the compressor B of the low temperature refrigeration cycle S2 is started, the apparatus is operated for a predetermined time (of, for example, 40 seconds) within the range not exceeding a certain pressure level C (of, for example, 4 MPa) as required by safety standards for the compressor B. As the compressor B is operated for a predetermined time (of, for example, 40 seconds), the refrigerant in the low temperature refrigeration cycle S2 exchanges heat with the refrigerant in the high temperature refrigeration cycle S1 at the cascade condenser 11 and is thereby cooled, and produces cold energy at the evaporator 24 so that its temperature drops, and so does the pressure.

(e) After a predetermined time of operation (i.e., for 40 seconds), the apparatus is stopped for a predetermined time (of, for example, 3 minutes). As the compressor B is operated for a predetermined time (of, for example, 40 seconds) and stopped for a predetermined time (of, for example, 3 minutes), the refrigerant in the low temperature refrigeration cycle S2 exchanges heat with the refrigerant in the high temperature refrigeration cycle S1 at the cascade condenser 11 and is thereby cooled, and produces cold energy at the evaporator 24 so that its temperature drops, and so does the pressure. However, this does not suffice to negate the possibility that the pressure may exceed the level C as required by the safety standards if the apparatus is operated continuously. Therefore, the cycle of operating (for 40 seconds) and stopping (for 3 minutes) as described above is repeated several times (for example, two or three times).

(f) The compressor B is operated and stopped repeatedly for several times to confirm that the pressure does not exceed the level C as required by safety standards.

(g) The apparatus is then operated continuously only after it is confirmed that the pressure does not exceed the level C as required by safety standards.

By following such a start-up procedure, it is no longer necessary, in the start-up procedure, to first introduce part of the refrigerant into an expansion tank before starting the compressor to lower the pressure in the low temperature refrigeration cycle S2, and then to return the refrigerant that was introduced in the expansion tank 27 back to the low temperature refrigeration cycle S2, i.e., in other words, the expansion tank is no longer necessary.

The apparatus can be started up under automatic control, to achieve the effects of the present invention described above reliably, by inputting data obtained through preliminary tests in a control device, and by controlling various units automatically on the basis of signals sent from the control device, such that the compressor A is started up, and when a predetermined refrigerant temperature is achieved at the exit of the cascade condenser, the compressor B in the low temperature refrigeration cycle is started, and the cycle of operating and stopping the compressor for predetermined time is repeated several times to confirm that the pressure does not exceed the level C as required by safety standards, after which the apparatus is operated continuously.

This start-up procedure according to the present invention can of course be performed manually, or manually in part and automatically in part.

The foregoing description of embodiments of the present invention is for illustrative purposes only and not to limit the invention as set forth in the claims, or to reduce the scope thereof. Various components of the present invention are not limited to those of the embodiments described above, and various modifications are possible without departing from the technical scope as defined by the claims.

INDUSTRIAL APPLICABILITY

The binary refrigeration apparatus of the present invention configured by connecting a high temperature refrigeration cycle and a low temperature refrigeration cycle via a cascade condenser is characterized in that the high temperature refrigeration cycle is filled with propane as a refrigerant and a refrigerator oil, while the low temperature refrigeration cycle is filled with a hydrocarbon having a boiling point of −80° C. or lower as a refrigerant, a refrigerator oil, and an oil return agent. With the use of propane and a hydrocarbon having a boiling point of −80° C. or lower as the refrigerants, low temperatures of about −40° C. are produced in the cascade condenser 11 of the high temperature refrigeration cycle S1, while ultralow temperatures of −80° C. or lower are produced in the evaporator 24 of the low temperature refrigeration cycle S2 without worries regarding the Ozone Depletion Potential (ODP) and Global Warming Potential (GWP). With the use of a hydrocarbon as the refrigerant having a boiling point of −80° C. or lower, a refrigerator oil, and an oil return agent that fill the low temperature refrigeration cycle, the compatibility between the refrigerant and the refrigerator oil is significantly improved, so that problems such as stagnation of the refrigerator oil discharged from the refrigerant compressor in the cycle, lubrication failure due to a decrease in the amount of refrigerator oil in the refrigerant compressor, and blockage in an expansion mechanism such as capillaries will not occur. As a result, the oil separator is no longer necessary. The refrigerant is excellent in stability, as the oil does not undergo hydrolysis as an ester oil does during use. The apparatus yields higher COPs as compared with HFC-operated cycles, so that the amount of refrigerant can be reduced by half, or the power output of the compressor can be reduced by half. The apparatus thus provides such remarkable effects and features a high potential in industrial applications.

REFERENCE SIGNS LIST

S1 high temperature refrigeration cycle
S2 low temperature refrigeration cycle
1, 6, A, B compressor
2, 15 discharge-side pipe
3, 5 auxiliary condenser
4, 7 oil cooler
8 condenser
9, 21 dryer
10, 22, 28 capillary tube
11 cascade condenser
12 fluid collector
13, 26 intake-side pipe
14 cooling fan
16 oil separator
17 return pipe
18 pipe
19 intake-side heat exchanger
20 pipe
23 inlet pipe
24 evaporator
25 outlet pipe
27 expansion tank
30 heat exchanger

The invention claimed is:

1. A binary refrigeration apparatus comprising:
a high temperature refrigeration cycle; and
a low temperature refrigeration cycle including an evaporator; and
a cascade condenser connecting the high temperature refrigeration cycle and the low temperature refrigeration cycle, wherein:
the high temperature refrigeration cycle is filled with propane and a refrigerator oil,
the low temperature refrigeration cycle is filled with a refrigerant including a hydrocarbon having a boiling point of −80° C. or lower, a refrigerator oil, and an oil return agent,
an ultralow temperature of −80° C. or lower is produced by evaporating the hydrocarbon in the evaporator,
the hydrocarbon having a boiling point of −80° C. or lower consists of ethane,
the oil return agent is contained in an amount of from 0.1 to 14 mass % with respect to the ethane in the refrigerant in the low temperature refrigeration cycle, and
the low temperature refrigeration cycle does not include an oil separator.

2. The binary refrigeration apparatus according to claim 1, wherein:
the refrigerator oil is an alkylbenzene oil.

3. The binary refrigeration apparatus according to claim 2, wherein the oil return agent is n-pentane.

4. The binary refrigeration apparatus according to claim 2, wherein the oil return agent is one or more selected from the group consisting of n-butane, isobutane, n-hexane, isohexane, 3-methylpentane, neohexane, and 2,3-dimethylbutane.

5. The binary refrigeration apparatus according to claim 2, wherein two or more types of oil return agents are contained in the refrigerant of the low temperature refrigeration cycle.

6. The binary refrigeration apparatus according to claim 1, wherein the oil return agent is one or more selected from the group consisting of n-butane, isobutane, n-hexane, isohexane, 3-methylpentane, neohexane, and 2,3-dimethylbutane.

7. The binary refrigeration apparatus according to claim 1, wherein two or more types of oil return agents are contained in the refrigerant of the low temperature refrigeration cycle.

* * * * *